United States Patent
Bergeal et al.

(10) Patent No.: US 9,138,724 B2
(45) Date of Patent: Sep. 22, 2015

(54) OXIDATION CATALYST FOR A COMBUSTION ENGINE

(71) Applicant: JOHNSON MATTHEY PUBLIC LIMITED COMPANY, London (GB)

(72) Inventors: David Bergeal, Ware (GB); Paul Richard Phillips, Bassingbourn (GB); Andrew Francis Chiffey, Ware (GB); John Benjamin Goodwin, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/182,396

(22) Filed: Feb. 18, 2014

(65) Prior Publication Data

US 2014/0241964 A1    Aug. 28, 2014

Related U.S. Application Data (60) Provisional application No. 61/769,303, filed on Feb. 26, 2013.

(51) Int. Cl.
*B01D 53/56* (2006.01)
*B01D 53/94* (2006.01)
(Continued)

(52) U.S. Cl.
CPC ............... *B01J 23/44* (2013.01); *B01D 53/944* (2013.01); *B01D 53/945* (2013.01); *B01J 23/40* (2013.01); *B01J 23/42* (2013.01); *B01J 35/0006* (2013.01); *B01J 35/0073* (2013.01); *B01J 37/0221* (2013.01); *B01J 37/0234* (2013.01); *B01J 37/08* (2013.01); *F01N 3/101* (2013.01); *B01D 2255/1021* (2013.01);
(Continued)

(58) Field of Classification Search
CPC ............ B01J 23/10; B01J 23/38; B01J 23/40; B01J 23/42; B01J 23/44; B01J 23/46; B01J 23/48; B01J 23/50; B01J 23/52; B01D 53/945
USPC ......... 502/243, 261–263, 304, 326–328, 330, 502/332–334, 339, 348–351, 355, 415, 502/439; 423/213.5; 60/299; 422/177, 180
See application file for complete search history.

(56) References Cited

U.S. PATENT DOCUMENTS

| | | |
|---|---|---|
| 4,407,738 A | 10/1983 | Eskinazi et al. |
| 5,043,311 A | 8/1991 | Engler et al. |

(Continued)

FOREIGN PATENT DOCUMENTS

| | | |
|---|---|---|
| EP | 0125565 A2 | 11/1984 |
| EP | 0766993 B1 | 4/1997 |

(Continued)

*Primary Examiner* — Cam N. Nguyen
(74) *Attorney, Agent, or Firm* — Kevin M. Carroll (57) ABSTRACT

An oxidation catalyst for treating an exhaust gas produced by a combustion engine, wherein the oxidation catalyst comprises a substrate and a catalyst layer, wherein the catalyst layer comprises: a first support material; a first noble metal; and a second noble metal; wherein the catalyst layer is disposed on a surface of the substrate, and the catalyst layer has a non-uniform distribution of the first noble metal in a direction perpendicular to the surface of the substrate. The oxidation catalyst can be used to oxidize carbon monoxide (CO), hydrocarbons (HCs) and also oxides of nitrogen ($NO_x$) in such an exhaust gas.

16 Claims, 2 Drawing Sheets

(51) Int. Cl.

| | | |
|---|---|---|
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *F01N 3/10* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 21/04* | (2006.01) | |
| *B01J 37/02* | (2006.01) | |
| *B01J 37/08* | (2006.01) | |
| *B01J 35/00* | (2006.01) | |

(52) U.S. Cl.
CPC .... *B01D 2255/1023* (2013.01); *B01D 2255/50* (2013.01); *B01D 2255/905* (2013.01); *B01D 2255/912* (2013.01); *B01D 2258/012* (2013.01)

(56) References Cited

U.S. PATENT DOCUMENTS

| | | | |
|---|---|---|---|
| 5,473,887 A | 12/1995 | Takeshima et al. | |
| 5,496,788 A | 3/1996 | Domesle et al. | |
| 6,849,571 B2* | 2/2005 | Hoshino et al. | 502/243 |
| 6,956,005 B2* | 10/2005 | Leiber | 502/185 |
| 7,056,859 B2* | 6/2006 | Hachisuka | 502/327 |
| 7,150,866 B2* | 12/2006 | Wieland et al. | 423/652 |
| 7,214,331 B2* | 5/2007 | Jiang et al. | 252/373 |
| 7,473,665 B2* | 1/2009 | Kawai et al. | 502/217 |
| 7,598,205 B2* | 10/2009 | Suzuki | 502/325 |
| 7,601,670 B2* | 10/2009 | Yasuda et al. | 502/326 |
| 7,638,460 B2* | 12/2009 | Nakamura et al. | 502/326 |
| 8,652,429 B2 | 2/2014 | Sumiya et al. | 423/213.2 |
| 8,852,519 B2 | 10/2014 | Watanabe et al. | 422/180 |
| 2004/0063577 A1* | 4/2004 | Wieland et al. | 502/339 |
| 2005/0191233 A1* | 9/2005 | Jiang et al. | 423/651 |
| 2008/0069765 A1* | 3/2008 | Jiang et al. | 423/651 |
| 2008/0207438 A1* | 8/2008 | Suzuki et al. | 502/302 |
| 2009/0099011 A1* | 4/2009 | Miura | 502/303 |
| 2010/0158768 A1* | 6/2010 | Iwachido et al. | 422/177 |
| 2012/0065443 A1* | 3/2012 | Mabande et al. | 585/430 |
| 2012/0107188 A1* | 5/2012 | Watanabe et al. | 422/180 |
| 2012/0204547 A1* | 8/2012 | Ishimaru et al. | 60/301 |
| 2013/0150236 A1* | 6/2013 | Aoki | 502/303 |
| 2014/0130760 A1* | 5/2014 | Sumiya et al. | 123/1 A |
| 2014/0154163 A1* | 6/2014 | Andersen et al. | 423/237 |
| 2014/0212350 A1* | 7/2014 | Andersen et al. | 423/237 |

FOREIGN PATENT DOCUMENTS

| | | |
|---|---|---|
| GB | 2000985 A | 1/1979 |
| WO | 9809726 A1 | 3/1998 |
| WO | 9947260 A1 | 9/1999 |
| WO | 2006056811 A1 | 6/2006 |

* cited by examiner

OXIDATION CATALYST FOR A COMBUSTION ENGINE

CROSS REFERENCE TO RELATED APPLICATIONS

This application claims priority benefit to Great Britain Patent Application No. 1303396.4 filed on Feb. 26, 2013 and to U.S. Provisional Patent Application No. 61/769,303 filed on Feb. 26, 2013, both of which are incorporated herein by reference.

FIELD OF THE INVENTION

The invention relates to an oxidation catalyst for treating an exhaust gas from a combustion engine, methods involving the oxidation catalyst and the use of the oxidation catalyst. The invention also relates to a method for preparing the oxidation catalyst. The invention further relates to an exhaust system or a vehicle comprising the oxidation catalyst.

BACKGROUND TO THE INVENTION

Combustion engines produce exhaust gases that contain pollutants, such as carbon monoxide (CO), unburned hydrocarbons (HCs), oxides of nitrogen ($NO_x$) and particulate matter (PM). Emissions standards for pollutants in an exhaust gas produced by a combustion engine, particularly for vehicular engines, are becoming increasingly stringent. There is a need to provide improved catalysts and exhaust systems for treating and removing the pollutants in such exhaust gases that are able to meet these standards and which are cost-effective.

The exhaust gas from gasoline and diesel engines is commonly treated with a catalyst that is able to oxidise (i) carbon monoxide (CO) to carbon dioxide ($CO_2$) and (ii) hydrocarbons (HCs) to water ($H_2O$) and carbon dioxide ($CO_2$). Three-way catalysts (TWCs) are typically employed to treat the exhaust gas from a gasoline engine, which is able to reduce oxides of nitrogen ($NO_x$) to nitrogen ($N_2$), water ($H_2O$) and carbon dioxide ($CO_2$), in addition to performing oxidation reactions (i) and (ii). The exhaust gas from a compression ignition engine, such as a diesel engine, is typically treated with an oxidation catalyst (commonly called a diesel oxidation catalyst (DOC)) that performs oxidation reactions (i) and (ii). Some diesel oxidation catalysts are also able to oxidise nitrogen monoxide (NO) to nitrogen dioxide ($NO_2$), which can aid removal of $NO_x$ by an additional, downstream emissions control device.

Oxidation catalysts for combustion engines typically contain one or more noble metals. The specific noble metal(s) selected for inclusion in an oxidation catalyst will depend on a variety of factors, such as reactivity toward specific pollutants and under differing exhaust gas conditions, cost, durability at high temperatures, chemical compatibility with the support material and any other components of the catalyst, and susceptibility to poisoning by impurities. For example, platinum (Pt) and palladium (Pd) are each able to oxidise carbon monoxide (CO) and hydrocarbons (HCs) in an exhaust gas from a compression ignition engine. Palladium is more susceptible to poisoning by sulfur in fuel compared to platinum, but is generally cheaper than platinum and has greater thermal durability.

Due to the difference in properties between noble metals, diesel oxidation catalysts have been developed that contain layered arrangements of different noble metals. In such arrangements, the noble metals have been arranged to optimise their combined reactivity and to minimise degradation. For example, WO 2006/056811 describes a diesel oxidation catalyst where the top layer contains palladium and the bottom layer in contact with the substrate contains platinum. Palladium has a lower CO "light-off" temperature than platinum. Such an arrangement facilitates contact between palladium and CO in the exhaust gas, and the heat that is generated can bring the platinum in the bottom layer up to its "light-off" temperature.

An alternative approach is to vary the distribution of the noble metal within the channels of the substrate. U.S. Pat. No. 5,043,311 describes a monolithic or honeycomb-catalyst composed of an inert ceramic or metallic substrate traversed by parallel flow channels, a layer disposed thereon and composed of catalysis-promoting metal oxide and a catalytically active component supported by the metal oxide, wherein the concentration of the catalysis-promoting metal oxide or the catalytically active component increases from the periphery to the central axis of the substrate. The layer composed of the catalysis-promoting metal oxide and the catalytically active component that is disposed in each channel has a uniform composition. However, the composition of each layer varies from channel to channel.

Methods for preparing oxidation catalysts having layered arrangements or for preparing catalysts such as those described in U.S. Pat. No. 5,043,311 have increased production cost, particularly when compared to oxidation catalysts having a single layer where the composition of each layer is the same throughout all of the channels of the substrate. Also, the method employed for preparing multi-layered oxidation catalysts is necessarily more complicated and increases the likelihood of errors in production.

It is therefore desirable to provide an oxidation catalyst arrangement that offers the benefits of a multi-layered catalyst arrangement, but without the increased production cost or difficulty.

SUMMARY OF THE INVENTION

The inventors have surprisingly found that many or all of the benefits associated with multi-layered catalysts, particularly multi-layered diesel oxidation catalysts, can be obtained with an oxidation catalyst having a non-uniform distribution of at least one noble metal in a vertical direction through the catalyst-containing layer.

The distribution of noble metal in each layer of such multi-layered catalysts is generally uniform. Multi-layered catalysts each have a plurality of layers where the concentration of noble metal in one layer is different to the concentration of noble metal in another layer. This allows a variation in the concentration of noble metal to be obtained as the layers are traversed through their thickness. However, such a catalyst must be prepared by a process involving a plurality of coating steps to form each layer.

The oxidation catalyst of the invention can advantageously be prepared using the same methodology that is used for preparing catalysts having a single layer, whilst retaining many or all of the benefits in activity provided by a multi-layered catalyst. In particular, the oxidation catalyst of the invention may provide good or improved performance in the conversion of carbon monoxide (CO), hydrocarbons (HCs) and optionally also conversion of oxides of nitrogen ($NO_x$), whether by reduction or oxidation. The oxidation catalyst of the invention may possess a surprisingly low CO $T_{50}$.

The invention provides an oxidation catalyst for treating an exhaust gas from or produced by a combustion engine, wherein the oxidation catalyst comprises a substrate and a catalyst layer, wherein the catalyst layer comprises: a first support material; a first noble metal; and a second noble metal; wherein the catalyst layer is disposed on a surface of the substrate and has (i.e. the catalyst layer has) a non-uniform distribution of the first noble metal in a direction perpendicular to the surface of the substrate.

The invention also relates to an exhaust system for a combustion engine comprising the oxidation catalyst, and at least one emissions control device. It is to be understood that the oxidation catalyst and the exhaust system of the invention can be used with stationary combustion engines or mobile combustion engines. However, the oxidation catalyst and the exhaust system of the invention are particularly suitable for use with mobile combustion engines.

A further aspect of the invention relates to a vehicle or an apparatus, which vehicle or apparatus comprises an internal combustion engine and either the oxidation catalyst of the invention or the exhaust system of the invention.

The invention further relates to a method of treating an exhaust gas produced by an internal combustion engine, which method comprises contacting the exhaust gas with an oxidation catalyst, wherein the oxidation catalyst comprises: a substrate and a catalyst layer, wherein the catalyst layer comprises: a first support material; a first noble metal; and a second noble metal; wherein the catalyst layer is disposed on a surface of the substrate and has (i.e. the catalyst layer has) a non-uniform distribution of the first noble metal in a direction perpendicular to the surface of the substrate. The method is generally a method of treating carbon monoxide (CO), preferably treating carbon monoxide (CO), hydrocarbons (HCs) and optionally oxides of nitrogen ($NO_x$), such as nitrogen oxide (NO), in an exhaust gas from an internal combustion engine.

An additional aspect of the invention relates to the use of the oxidation catalyst of the invention for treating an exhaust gas produced by an internal combustion engine. The invention generally relates to the use of the oxidation catalyst to oxidise carbon monoxide (CO) in an exhaust gas from an internal combustion engine. In particular, the invention relates to use of the oxidation catalyst to oxidise carbon monoxide (CO), hydrocarbons (HCs) and optionally oxides of nitrogen ($NO_x$), such as nitrogen oxide (NO), in an exhaust gas from an internal combustion engine.

A further aspect of the invention relates to a method of preparing an oxidation catalyst, which method comprises:
(a) providing an aqueous slurry comprising a first support material precursor, a first noble metal component and a second noble metal component;
(b) applying the aqueous slurry onto a substrate to form a coating; and
(c) drying and calcining the coating using conditions that allow at least the first noble metal component to flow toward or away from the substrate.

DETAILED DESCRIPTION OF THE INVENTION

For the avoidance of doubt, the catalyst described herein is termed an "oxidation catalyst" because it can oxidise pollutants in an exhaust gas. The activity of the oxidation catalyst is not limited to oxidation reactions, although the oxidation catalyst should be able to oxidise one or more pollutants in an exhaust gas during normal use. For example, the oxidation catalyst may additionally be able to perform a reduction reaction and/or may be able to temporarily store one or more pollutants from the exhaust gas. It is to be understood that the term "oxidation catalyst" embraces a "three-way catalyst", such as a three-way-catalyst that is typically used for gasoline engines. The oxidation catalysts of the invention are, however, particularly suitable for use with compression ignition engines, especially diesel engines. Thus, it is preferred that the oxidation catalyst is for use in treating an exhaust gas produced by a compression ignition engine, or is a diesel oxidation catalyst (DOC).

It has been found that a non-uniform vertical distribution of noble metal can be achieved within a single layer. Thus, the benefits associated with layering to achieve a non-uniform vertical distribution of noble metal through the layers of the catalyst can be obtained by using a single layer or fewer layers.

In the oxidation catalyst of the invention, the catalyst layer has a non-uniform distribution of the first noble metal in a direction perpendicular to the surface of the substrate. For the avoidance of doubt, the catalyst layer is a single layer (i.e. the catalyst layer does not comprise a plurality of layers).

In general, the catalyst layer has non-uniform distribution of the first noble metal through its thickness (i.e. the direction perpendicular to the surface of the substrate represents the thickness of the catalyst layer).

Typically, the catalyst layer has a first surface and a second surface. Generally, the first surface is parallel (e.g. substantially parallel) to the second surface (i.e. the plane containing the first surface is parallel to the plane containing the second surface). The first surface and second surface are typically parallel to the surface of the substrate. Thus, the direction perpendicular to the surface of the substrate is also perpendicular to the first surface and/or the second surface.

The perpendicular distance between the first surface and the second surface is generally the thickness of the catalyst layer.

The first surface may be an exposed surface of the catalyst layer or an additional layer (e.g. second layer) may be disposed or supported on the first surface. The first surface is generally on the upper side (i.e. it is the top surface) of the catalyst layer. By exposed, it is meant that the first surface is not completely or substantially covered by another material and typically an exhaust gas passing through the catalyst comes into contact with the first surface before the second surface.

The second surface is not an exposed surface of the catalyst layer. Generally, the second surface is in direct contact with a surface of the substrate and/or a surface of another layer. Thus, the second surface is generally the underside (i.e. it is the bottom or lowest surface) of the catalyst layer.

The amount of the first noble metal may increase in a perpendicular direction toward the surface of the substrate (i.e. the amount of the first noble metal may increase in a perpendicular direction from the first surface to the second surface). The amount of the first noble metal may continuously increase or discontinuously increase, preferably continuously increase, in a perpendicular direction toward the surface of the substrate. Thus, when, for example, the oxidation catalyst comprises a single layer, which is the catalyst layer, then the amount of the first noble metal increases from an exposed surface of the catalyst layer toward the surface of the substrate.

The catalyst layer may have a linear or non-linear rate of increase in the amount of the first noble metal in a perpendicular direction toward the surface of the substrate (i.e. a linear or a non-linear rate of increase in the amount of the first noble metal in a perpendicular direction from the first surface to the second surface).

Typically, at least 60% of the total amount of the first noble metal (e.g. of the catalyst layer) is distributed between the second surface and a point or a plane in the catalyst layer that is half way between the first surface and the second surface (e.g. at 50% of the perpendicular distance between the first surface and the second surface). The plane is typically parallel to the second surface. The reference to "half way between" in this context generally refers to the mean halfway distance between the first surface and the second surface. It is preferred that at least 70%, more preferably at least 75%, such as at least 80%, still more preferably at least 90%, of the total amount of the first noble metal (e.g. of the catalyst layer) is distributed between the second surface and a point or a plane in the catalyst layer that is half way between the first surface and the second surface.

Generally, at least 60% of the total amount of the first noble metal (e.g. of the catalyst layer) is distributed between the second surface and a point or a plane in the catalyst layer that is 25% of the perpendicular distance from the second surface to the first surface. The plane is typically parallel to the second surface. It is preferred that at least 70%, more preferably at least 75%, such as at least 80%, still more preferably at least 90%, of the total amount of the first noble metal (e.g. of the catalyst layer) is distributed between the second surface and a point or a plane in the catalyst layer that is 25% of the perpendicular distance from the second surface to the first surface.

At least 60% of the total amount of the first noble metal (e.g. of the catalyst layer) can be distributed between the second surface and a point or a plane in the catalyst layer that is 10% of the perpendicular distance from the second surface to the first surface. The plane is typically parallel to the second surface. It is preferred that at least 70%, more preferably at least 75%, such as at least 80%, still more preferably at least 90%, of the total amount of the first noble metal (e.g. of the catalyst layer) is distributed between the second surface and a point or a plane in the catalyst layer that is 10% of the perpendicular distance from the second surface to the first surface.

Alternatively, the amount of the first noble metal may decrease in a perpendicular direction toward the surface of the substrate (i.e. the amount of the first noble metal may decrease from the first surface to the second surface). The amount of the first noble metal may continuously decrease or discontinuously decrease, preferably continuously decrease, in a perpendicular direction toward the surface of the substrate. Thus, when, for example, the oxidation catalyst comprises a single layer, which is the catalyst layer, then the amount of the first noble metal decreases from an exposed surface of the catalyst layer toward the surface of the substrate.

The catalyst layer may have a linear or non-linear rate of decrease in the amount of the first noble metal in a perpendicular direction toward the surface of the substrate (i.e. a linear or a non-linear rate of decrease in the amount of the first noble metal in a perpendicular direction from the first surface to the second surface).

Typically, at least 60% of the total amount of the first noble metal (e.g. of the catalyst layer) is distributed between the first surface and a point or a plane in the catalyst layer that is half way between the first surface and the second surface (e.g. at 50% of the perpendicular distance between the first surface and the second surface). The plane is typically parallel to the first surface. The reference to "half way between" in this context generally refers to the mean halfway distance between the first surface and the second surface. It is preferred that at least 70%, more preferably at least 75%, such as at least 80%, still more preferably at least 90%, of the total amount of the first noble metal (e.g. of the catalyst layer) is distributed between the first surface and a point or a plane in the catalyst layer that is half way between the first surface and the second surface.

Generally, at least 60% of the total amount of the first noble metal (e.g. of the catalyst layer) is distributed between the first surface and a point or a plane in the catalyst layer that is 25% of the perpendicular distance from the first surface to the second surface. The plane is typically parallel to the first surface. It is preferred that at least 70%, more preferably at least 75%, such as at least 80%, still more preferably at least 90%, of the total amount of the first noble metal (e.g. of the catalyst layer) is distributed between the first surface and a point or a plane in the catalyst layer that is 25% of the perpendicular distance from the first surface to the second surface.

At least 60% of the total amount of the first noble metal (e.g. of the catalyst layer) can be distributed between the first surface and a point or a plane in the catalyst layer that is 10% of the perpendicular distance from the first surface to the second surface. The plane is typically parallel to the first surface. It is preferred that at least 70%, more preferably at least 75%, such as at least 80%, still more preferably at least 90%, of the total amount of the first noble metal (e.g. of the catalyst layer) is distributed between the first surface and a point or a plane in the catalyst layer that is 10% of the perpendicular distance from the first surface to the second surface.

It is preferred that the amount of the first noble metal decreases in a perpendicular direction toward the surface of the substrate.

The non-uniform distribution of the first noble metal in a direction perpendicular to the surface of the substrate may, in general, be a gradated distribution of the first noble metal. Alternatively, the non-uniform distribution of the first noble metal in a direction perpendicular to the surface of the substrate may be a step-wise distribution of the first noble metal.

The catalyst layer may have a uniform horizontal distribution or a non-uniform horizontal distribution of the first noble metal.

Typically, the distribution of the first noble metal in a direction parallel to the surface of the substrate (i.e. a longitudinal plane) and perpendicular to a central longitudinal axis of the substrate (i.e. direction parallel to the inlet end face and/or the outlet end face of the substrate) is uniform or non-uniform. It is preferred that the distribution of the first noble metal in a direction parallel to the surface of the substrate and perpendicular to a central longitudinal axis of the substrate is uniform.

Generally, the distribution of the first noble metal in a direction parallel to the surface of the substrate (i.e. a longitudinal plane) and parallel to a central longitudinal axis of the substrate (i.e. direction perpendicular to the inlet end face and/or the outlet end face of the substrate) may be uniform or non-uniform. It is preferred that the distribution of the first noble metal in a direction parallel to the surface of the substrate and parallel to a central longitudinal axis of the substrate is uniform.

In general, the first noble metal may be selected from the group consisting of ruthenium, rhodium, palladium, osmium, iridium, platinum, silver and gold. It is preferred that the first noble metal is selected from the group consisting of rhodium, palladium, platinum and gold. More preferably, the first noble metal is selected from the group consisting of palladium, platinum and gold. The first noble metal may be palladium. The first noble metal may be platinum. The first noble metal may be gold. Even more preferably, the first noble metal is palladium.

Generally, the catalyst layer comprises a total amount of the first noble metal of 0.5 to 15% by weight (e.g. 11.5 to 14% by weight or 12 to 15% by weight), preferably 1 to 10% by weight, more preferably 2 to 9% by weight (e.g. 3 to 8% by weight), such as 4 to 7% by weight (e.g. 5 to 6% by weight).

The first noble metal is typically in particulate form. Thus, the catalyst layer comprises particles of a first noble metal, and wherein the catalyst layer has a non-uniform distribution of particles of the first noble metal in a direction perpendicular to the surface of the substrate.

When the first noble metal is in particulate form, then typically the particles of the first noble metal have a $D_{90}$ of ≤40 nm, more preferably ≤30 nm, and even more preferably ≤20 nm.

Typically, the catalyst layer comprises a first noble metal in an amount of 5 to 300 g ft$^{-3}$, more preferably 10 to 250 g ft$^{-3}$, such as 25 to 200 g ft$^{-3}$, still more preferably 35 to 175 g ft$^{-3}$, and even more preferably 50 to 150 g ft$^{-3}$ (e.g. 75 to 125 g ft$^{-3}$). For example, the catalyst layer may comprise the first noble metal in an amount of 110 to 300 g ft$^{-3}$, preferably 125 to 275 g ft$^{-3}$, such as 150 to 250 g ft$^{-3}$, more preferably 175 to 200 g ft$^{-3}$. In some instances, a relatively high loading of first noble metal, particularly when the first noble metal is palladium, is beneficial (e.g. for CO oxidation activity).

The first support material typically comprises, or consists essentially of, a refractory oxide selected from the group consisting of alumina, magnesia, silica, zirconia, titania, ceria and a composite oxide or a mixed oxide of two or more thereof. In principle any suitable support material may be used as the first support material.

Additionally or alternatively, the first support material may comprise, or consist essentially of, a hydrocarbon adsorbent, such as a hydrocarbon adsorbent as described below.

It is preferred that the refractory oxide is selected from the group consisting of alumina, silica, zirconia, ceria and a composite oxide or a mixed oxide of two or more thereof. Preferred mixed oxides or composite oxides include silica-alumina and ceria-zirconia. More preferably, the refractory oxide is selected from the group consisting of alumina, silica, ceria, silica-alumina and ceria-zirconia. The refractory oxide may be alumina. The refractory oxide may be silica. The refractory oxide may be ceria. The refractory oxide may be silica-alumina. The refractory oxide may be ceria-zirconia.

When the refractory oxide is silica-alumina, then generally the refractory oxide consists essentially of 20 to 95% by weight of alumina and 5 to 80% by weight of silica (e.g. 50 to 95% by weight alumina and 5 to 50% by weight silica), preferably 35 to 80% by weight of alumina and 20 to 65% by weight silica (e.g. 55 to 80% by weight alumina and 20 to 45% by weight silica), even more preferably 45 to 75% by weight of alumina and 25 to 55% by weight silica.

When the refractory oxide is ceria-zirconia, then generally the refractory oxide consists essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The refractory oxide may be doped with a dopant. The inclusion of a dopant may stabilise the refractory oxide or support material. Typically, the dopant may be selected from the group consisting of zirconium (Zr), titanium (Ti), silicon (Si), yttrium (Y), lanthanum (La), praseodymium (Pr), samarium (Sm), neodymium (Nd), barium (Ba) and an oxide thereof. In general, the dopant is different to the refractory oxide (i.e. the cation of the refractory oxide). Thus, for example, when the refractory oxide is titania, then the dopant is not titanium or an oxide thereof.

When the refractory oxide is doped with a dopant, then typically the refractory oxide comprises a total amount of dopant of 0.1 to 10% by weight. It is preferred that the total amount of dopant is 0.25 to 5% by weight, more preferably 0.5 to 2.5% by weight (e.g. about 1% by weight).

Typically, the catalyst layer comprises an amount of the first support material of 0.1 to 3.5 g in$^{-3}$ (e.g. 0.25 to 3.0 g in$^{-3}$), preferably 0.3 to 2.5 g in$^{-3}$, still more preferably 0.5 to 2.0 g in$^{-3}$, and even more preferably 0.6 to 1.75 g in$^{-3}$ (e.g. 0.75 to 1.5 g in$^{-3}$).

In general, the first support material is in particulate form. The first support material may have a $D_{90}$ particle size of ≤50 μm, preferably ≤30 μm, and more preferably ≤20 μm (as determined by conventional laser diffraction techniques). The particle size distribution of the support material is selected to aid adhesion to the substrate. The particles are generally obtained by milling.

The first noble metal may be disposed or supported on the first support material. Thus, the first noble metal can be dispersed on the first support material and/or impregnated into the first support material.

Generally, the second noble metal may be selected from the group consisting of ruthenium, rhodium, palladium, osmium, iridium, platinum, silver and gold. The second noble metal is typically a different metal to the first noble metal.

It is preferred that the second noble metal is selected from the group consisting of rhodium, palladium, platinum and gold. More preferably, the second noble metal is selected from the group consisting of palladium, platinum and gold. The second noble metal may be palladium. The second noble metal may be platinum. The second noble metal may be gold. Even more preferably, the second noble metal is platinum.

When the first noble metal is palladium and the second noble metal is gold or vice-versa, then the palladium and gold may form a palladium-gold alloy.

The catalyst layer may have a uniform or a non-uniform distribution of the second noble metal in a direction perpendicular to the surface of the substrate. It is preferred that the catalyst layer has a uniform distribution of the second noble metal in a direction perpendicular to the surface of the substrate.

When the catalyst layer has a non-uniform distribution of the second noble metal in a direction perpendicular to the surface of the substrate, then the amount of the second noble metal may increase or decrease in a perpendicular direction toward the surface of the substrate (i.e. the amount of the second noble metal may increase or decrease in a perpendicular direction from the first surface to the second surface). It is preferred that either (a) the amount of the second noble metal increases in a perpendicular direction toward the surface of the substrate when the amount of the first noble metal decreases in a perpendicular direction toward the surface of the substrate, or (b) the amount of the second noble metal decreases in a perpendicular direction toward the surface of the substrate when the amount of the first noble metal increases in a perpendicular direction toward the surface of the substrate.

The amount of the second noble metal may continuously increase, continuously decrease, discontinuously increase or discontinuously decrease, preferably continuously increase or continuously decrease, in a perpendicular direction toward the surface of the substrate.

The catalyst layer may have a linear or non-linear rate of increase or decrease in the amount of the second noble metal in a perpendicular direction toward the surface of the substrate (i.e. a linear or a non-linear rate of increase or decrease in the amount of the second noble metal in a perpendicular direction from the first surface to the second surface).

Typically, at least 60%, preferably at least 70%, more preferably at least 75%, such as at least 80%, still more preferably at least 90%, a of the total amount of the second noble metal (e.g. of the catalyst layer) is either distributed between (a) the second surface and a point or a plane in the catalyst layer that is half way between the first surface and the second surface (e.g. at 50% of the perpendicular distance between the first surface and the second surface), or (b) the first surface and a point or a plane in the catalyst layer that is half way between the first surface and the second surface (e.g. at 50% of the perpendicular distance between the first surface and the second surface. The plane is typically parallel to the first and/or second surface. The reference to "half way between" in this context generally refers to the mean halfway distance between the first surface and the second surface.

Generally, at least 60%, preferably at least 70%, more preferably at least 75%, such as at least 80%, still more preferably at least 90%, of the total amount of the second noble metal (e.g. of the catalyst layer) is distributed between either (a) the second surface and a point or a plane in the catalyst layer that is 25% of the perpendicular distance from the second surface to the first surface, or (b) the first surface and a point or a plane in the catalyst layer that is 25% of the perpendicular distance from the first surface to the second surface. The plane is typically parallel to the first surface and/or second surface.

At least 60%, preferably at least 70%, more preferably at least 75%, such as at least 80%, still more preferably at least 90%, of the total amount of the second noble metal (e.g. of the catalyst layer) can be distributed between either (a) the second surface and a point or a plane in the catalyst layer that is 10% of the perpendicular distance from the second surface to the first surface, or (b) the first surface and a point or a plane in the catalyst layer that is 10% of the perpendicular distance from the first surface to the second surface. The plane is typically parallel to the first surface and/or second surface.

The non-uniform distribution of the second noble metal in a direction perpendicular to the surface of the substrate may, in general, be a gradated distribution of the second noble metal. Alternatively, the non-uniform distribution of the second noble metal in a direction perpendicular to the surface of the substrate may be a step-wise distribution of the second noble metal.

The catalyst layer may have a uniform horizontal distribution or a non-uniform horizontal distribution of the second noble metal.

Typically, the distribution of the second noble metal in a direction parallel to the surface of the substrate (i.e. a longitudinal plane) and perpendicular to a central longitudinal axis of the substrate (i.e. direction parallel to the inlet end face and/or the outlet end face of the substrate) is uniform or non-uniform. It is preferred that the distribution of the second noble metal in a direction parallel to the surface of the substrate and perpendicular to a central longitudinal axis of the substrate is uniform.

Generally, the distribution of the second noble metal in a direction parallel to the surface of the substrate (i.e. a longitudinal plane) and parallel to a central longitudinal axis of the substrate (i.e. direction perpendicular to the inlet end face and/or the outlet end face of the substrate) may be uniform or non-uniform. It is preferred that the distribution of the second noble metal in a direction parallel to the surface of the substrate and parallel to a central longitudinal axis of the substrate is uniform.

The catalyst layer typically comprises a total amount of the second noble metal of 0.5 to 15% by weight (e.g. 11.5 to 14% by weight or 12 to 15% by weight), preferably 1 to 10% by weight, more preferably 2 to 9% by weight (e.g. 3 to 8% by weight), such as 4 to 7% by weight (e.g. 5 to 6% by weight).

The second noble metal is typically in particulate form. When the second noble metal is in particulate form, then typically the particles of the second noble metal have a $D_{90}$ of ≤40 nm, more preferably ≤30 nm, and even more preferably ≤20 nm.

The second noble metal may be disposed or supported on the first support material. Thus, the second noble metal can be dispersed on the first support material and/or impregnated into the first support material.

Both the first noble metal and the second noble metal may be disposed or supported on the first support material. It is possible to fix a noble metal onto a support material before preparing a washcoat to coat a substrate. It is preferred that only the first noble metal is disposed or supported on the first support material.

Typically, the catalyst layer comprises a second noble metal in an amount of 5 to 300 g ft$^{-3}$, more preferably 10 to 250 g ft$^{-3}$, such as 25 to 200 g ft$^{-3}$, still more preferably 35 to 175 g ft$^{-3}$, and even more preferably 50 to 150 g ft$^{-3}$ (e.g. 75 to 125 g ft$^{-3}$). For example, the catalyst layer may comprise the second noble metal in an amount of 110 to 300 g ft$^{-3}$, preferably 125 to 275 g ft$^{-3}$, such as 150 to 250 g ft$^{-3}$, more preferably 175 to 200 g ft$^{-3}$.

Generally, the oxidation catalyst, preferably the catalyst layer, comprises a total amount of the first noble metal and a total amount of the second noble metal in a ratio (by mass) of 20:1 to 1:20. Preferably, the ratio is 10:1 to 1:10 (e.g. 8:1 to 1:2.5), more preferably the ratio is 7.5:1 to 1:7.5, such as 5:1 to 1:5, still more preferably the ratio is 4:1 to 1:4 (e.g. 3:1 to 1:3), such as 2.5:1 to 1:2.5 (e.g. 2:1 to 1:2 or 1.5:1 to 1:1.5).

The oxidation catalyst typically comprises the first noble metal and the second noble metal in a total amount of 5 to 500 g ft$^{-3}$. Preferably, the total amount is 10 to 400 g ft$^{-3}$, more preferably 20 to 300 g ft$^{-3}$, still more preferably, 25 to 250 g ft$^{-3}$, and even more preferably 35 to 200 g ft$^{-3}$.

Preferred combinations of the first noble metal and the second noble metal include Pt and Pd; Pd and Au; Pt and Rh; Pd and Rh. When the first noble metal is platinum and the second noble metal is palladium or vice-versa, then preferably the ratio of the total mass of platinum (Pt) to the total mass of palladium (Pd) is 3:1 to 1:3, such as 2:1 to 1:2, and more preferably 1.5:1 to 1:1.5.

The catalyst layer may further comprise a third noble metal. Generally, the third noble metal may be selected from the group consisting of ruthenium, rhodium, palladium, osmium, iridium, platinum, silver and gold. The third noble metal is typically a different metal to both the first noble metal and the second noble metal.

It is preferred that the third noble metal is selected from the group consisting of rhodium, palladium, platinum and gold. More preferably, the third noble metal is selected from the group consisting of rhodium and gold. The third noble metal may be rhodium. The third noble metal may be gold. Even more preferably, the third noble metal is rhodium.

Preferred combinations of the first noble metal, the second noble metal and the third noble metal include Pd, Pt and Au; Pd, Pt and Rh; Pd, Au and Rh. Most preferred is the combination of Pd, Pt and Au (e.g. the first noble metal, the second noble metal and the third noble metal respectively).

In general, it is preferred that the oxidation catalyst comprises only two noble metals (i.e. the first noble metal and the second noble metal).

The catalyst layer typically comprises a total amount of noble metal of 0.5 to 15% by weight (e.g. 11.5 to 14% by weight or 12 to 15% by weight), preferably 1 to 10% by weight, more preferably 2 to 9% by weight (e.g. 3 to 8% by weight), such as 4 to 7% by weight (e.g. 5 to 6% by weight).

When the oxidation catalyst is used as a diesel oxidation catalyst, then generally the total amount of noble metal (e.g. the first noble metal, the second noble metal and, if present, the third noble metal) is 25 to 200 g ft$^{-3}$, more preferably 40 to 160 g ft$^{-3}$. When the oxidation catalyst is used as a catalysed soot filter, then the total amount of noble metal (e.g. the first noble metal, the second noble metal and, if present, the third noble metal) is 5 to 100 g ft$^{-3}$, more preferably 10 to 40 g ft$^{-3}$.

The oxidation catalyst, or the catalyst layer, may further comprise a hydrocarbon adsorbent. The hydrocarbon adsorbent may be present in a separate layer to the catalyst layer.

Typically, the hydrocarbon adsorbent is selected from the group consisting of a zeolite, active charcoal, porous graphite and a combination of two or more thereof. It is preferred that the hydrocarbon adsorbent is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

Typically, the zeolite has a silica to alumina molar ratio of at least 25:11, preferably at least 25:1, with useful ranges of from 25:1 to 1000:1, 50:1 to 500:1 as well as 25:1 to 100:1, 25:1 to 300:1, from 100:1 to 250:1. Zeolites having a high molar ratio of silica to alumina show improved hydrothermal stability.

When the oxidation catalyst comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

The oxidation catalyst of the invention may further comprise an oxygen storage material. Such materials are well-known in the art. The oxygen storage material may be selected from ceria (CeO$_2$) and ceria-zirconia (CeO$_2$—ZrO$_2$), such as a ceria-zirconia solid solution. It is preferred that the oxygen storage material is different to the refractory oxide of the first support material.

When the oxygen storage material is selected from ceria and ceria-zirconia, then preferably the oxygen storage material is either (a) ceria when the first support material comprises, or consists essentially of, ceria-zirconia, or (b) ceria-zirconia when the first support material comprises, or consists essentially of, ceria.

The oxidation catalyst, the catalyst layer or the first support material may further comprise a reducible oxide. The reducible oxide may form a composite oxide or a mixed oxide with the refractory oxide.

Typically, the reducible oxide may be selected from the group consisting of an oxide of manganese (e.g. MnO$_2$ and/or Mn$_2$O$_3$), an oxide of iron (e.g. Fe$_2$O$_3$), an oxide of tin (e.g. SnO$_2$), an oxide of copper (e.g. CuO), an oxide of cobalt (e.g. CoO and/or Co$_2$O$_3$), an oxide of titanium (e.g. TiO$_2$) and an oxide of cerium (e.g. CeO$_2$). The reducible oxide is preferably different (i.e. different in composition) to the refractory oxide. Preferably, the reducible oxide is an oxide of iron or an oxide of cerium, more preferably the reducible oxide is an oxide of iron.

When a reducible oxide is present, then typically the oxidation catalyst has a ratio by mass of the reducible oxide to the refractory oxide of 10:1 to 1:10, preferably 5:1 to 1:5 (e.g. 1:1 to 1:5), still more preferably 1:1 to 1:2.5.

The oxidation catalyst, or the catalyst layer, may further comprise a base metal promoter. The base metal promoter may be selected from the group consisting of an alkali metal, an alkaline earth metal, a lanthanide metal and an oxide thereof. It is preferred that the base metal promoter is an alkali metal, alkaline earth metal or an oxide thereof. More preferably, the base metal promoter is an alkaline earth metal (e.g. Ca, Mg, Sr or Ba, preferably Ba) or an oxide thereof.

The oxidation catalyst of the invention may comprise a second layer. The second layer may comprise, or consist essentially of, a hydrocarbon adsorbent and/or a third noble metal (e.g. a third noble metal as defined above) and/or a refractory oxide (e.g. a zeolite) and/or a reducible oxide and/or an oxygen storage material and/or a base metal promoter. Preferably, the second layer comprises, or consists essentially of, a hydrocarbon adsorbent and/or a third noble metal, and/or a refractory oxide. More preferably, the second layer comprises, or consists essentially of, a hydrocarbon adsorbent and/or a refractory oxide.

When the second layer comprises a third noble metal, then preferably the second layer comprises platinum and/or palladium. It is further preferred that the second layer has a ratio by mass of platinum (Pt) to palladium (Pd) of 10:1 to 1:10, more preferably 5:1 to 1:5, still more preferably 2.5:1 to 1:2.5, such as 2:1 to 1:2 (e.g. 1:1 to 1:1.5). Other preferable ratios for the ratio by mass of platinum (Pt) to palladium (Pd) in the second layer include 8.5:1 to 1:2.5, such as 7.5:1 to 1:2 (e.g. 6:1 to 1:1.5), still more preferably 5:1 to 1:1.25 (e.g. 5:1 to 1:1).

The catalyst layer may be disposed or supported on the second layer. The second layer may be disposed directly onto a surface of the substrate (i.e. the second layer is in contact with a surface of the substrate). Thus, the second layer may be disposed between the catalyst layer and a surface of the substrate (i.e. the catalyst layer is disposed on a second layer and optionally the second layer is disposed directly onto a surface of the substrate).

Alternatively, the second layer may be disposed or supported on the catalyst layer. The catalyst layer may be disposed directly onto a surface of the substrate (i.e. the catalyst layer is in contact with a surface of the substrate). Thus, the catalyst layer may be disposed between the second layer and a surface of the substrate (i.e. the second layer is disposed on the catalyst layer and optionally the catalyst layer is disposed directly onto a surface of the substrate).

The oxidation catalyst of the invention typically comprises a single layer, which single layer is the catalyst layer. In general, the catalyst layer is disposed directly onto a surface of the substrate (i.e. the catalyst layer is in contact with a surface of the substrate).

In general, the oxidation catalyst of the invention comprises a single substrate (i.e. only one substrate).

Substrates for supporting oxidation catalysts for treating the exhaust gas from a combustion engine are well known in the art. Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith. It is preferred that the monolith is a flow-through monolith or a filtering monolith.

It is preferred that the oxidation catalyst of the invention is for use as a diesel oxidation catalyst (DOC) or a catalysed soot filter (CSF). In practice, catalyst formulations employed in DOCs and CSFs are similar. Generally, however, a principle difference between a DOC and a CSF is the substrate onto which the catalyst formulation is coated and the amount of noble metal in the coating.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The invention also relates to an exhaust system for a combustion engine comprising the oxidation catalyst, and at least one emissions control device. In general, the emissions control device is separate to the oxidation catalyst (e.g. the emissions control device has a separate substrate to the substrate of the oxidation catalyst), and preferably the oxidation catalyst is upstream of the emissions control device.

The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF) catalysts are all well known in the art.

Examples of emissions control devices for use with the oxidation catalyst of the invention or for inclusion in the exhaust system of the invention are provided below.

A diesel particulate filter is an emissions control device having a filtering substrate. The diesel particulate filter preferably comprises a substrate, wherein the substrate is a filtering monolith or a flow-through monolith as defined above, preferably a filtering monolith. The substrate may be coated with a catalyst formulation.

The catalyst formulation of the diesel particulate file may be suitable for oxidising (i) particulate matter (PM) and/or (ii) carbon monoxide (CO) and hydrocarbons (HCs). When the catalyst formulation is suitable for oxidising PM, then the resulting emissions control device is known as a catalysed soot filter (CSF). Typically, the catalyst formulation of a CSF comprises a noble metal, such as a first noble metal and/or a second noble metal as defined above.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust system of the invention comprises an SCR catalyst, then the exhaust system may further comprise an injector for injecting a nitrogenous reductant, such as ammonia or urea, into exhaust gas downstream of the catalyst for oxidising carbon monoxide (CO) and hydrocarbons (HCs) and upstream of the SCR catalyst. Alternatively or in addition to the injector, the exhaust system may further comprise an engine management means for enriching the exhaust gas with hydrocarbons. The SCR catalyst can then use the hydrocarbons as a reductant to reduce $NO_x$. When the substrate of the SCR catalyst is a filtering monolith, then the catalyst is an SCRF catalyst. An SCRF catalyst is an emissions control device having a filtering substrate.

Generally, SCR catalysts are unable to reduce substantial amounts of $NO_x$ in an exhaust gas shortly after start-up of a compression ignition engine because the exhaust gas temperature (and hence the temperature of the catalyst) is too low. Lean $NO_x$ trap catalysts (e.g. $NO_x$ adsorber catalysts) have, for example, been employed upstream of SCR catalysts, so that $NO_x$ can be stored until the SCR catalyst becomes active at higher exhaust gas temperatures. However, lean $NO_x$ trap catalysts are often unable to adequately store $NO_x$ when there is a large mass flow of exhaust gas (e.g. when the engine is operated at a high speed cycle).

In a first exhaust system embodiment, the exhaust system comprises the oxidation catalyst of the invention, preferably as a DOC, and a selective catalytic reduction (SCR) catalyst. Such an arrangement may be called a DOC/SCR. This embodiment also relates to the use of the oxidation catalyst for treating an exhaust gas from a combustion engine, particularly a compression ignition engine, in combination with a selective catalytic reduction filter (SCRF) catalyst. Preferably, the oxidation catalyst is, or is for use as, a diesel oxidation catalyst. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

A second exhaust system embodiment comprises the oxidation catalyst of the invention, preferably as a DOC, and a selective catalytic reduction filter (SCRF) catalyst. Such an arrangement may be called a DOC/SCRF. This embodiment also relates to the use of the oxidation catalyst for treating an exhaust gas from a combustion engine, particularly a compression ignition engine, in combination with a selective catalytic reduction filter (SCRF) catalyst. Preferably the oxidation catalyst is, or is for use as, a diesel oxidation catalyst. The oxidation catalyst of the invention is typically followed by (e.g. is upstream of) the selective catalytic reduction filter (SCRF) catalyst. A nitrogenous reductant injector may be arranged between the oxidation catalyst and the selective catalytic reduction filter (SCRF) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF) catalyst.

In a third exhaust system embodiment, the exhaust system comprises the oxidation catalyst of the invention, preferably as a DOC, and either a diesel particulate filter (DPF) or a catalysed soot filter (CSF). Such an arrangement may be called a DOC/DPF or a DOC/CSF. This embodiment also relates to the use of the oxidation catalyst for treating an exhaust gas from a combustion engine, particularly a compression ignition engine, in combination with a diesel particulate filter or a catalysed soot filter. Preferably the oxidation catalyst is, or is for use as, a diesel oxidation catalyst. The oxidation catalyst is typically followed by (e.g. is upstream of) the diesel particulate filter or the catalysed soot filter (CSF). Thus, for example, an outlet of the oxidation catalyst is connected to an inlet of the diesel particulate filter or the catalysed soot filter.

In a fourth exhaust system embodiment, the exhaust system comprises a diesel oxidation catalyst and the oxidation catalyst of the invention, preferably as a catalysed soot filter (CSF). This arrangement may also be called a DOC/CSF arrangement. The embodiment further relates to the use of the oxidation catalyst for treating an exhaust gas from a compression ignition engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A fifth exhaust system embodiment relates to an exhaust system comprising the oxidation catalyst of the invention, preferably as a DOC, a diesel particulate filter or a catalysed soot filter (CSF), and a selective catalytic reduction (SCR) catalyst. Such an arrangement may be called a DOC/DPF/SCR or a DOC/CSF/SCR and is a preferred exhaust system for a light-duty diesel vehicle. This embodiment also relates to the use of the oxidation catalyst for treating an exhaust gas from a combustion engine, particularly a compression ignition engine, in combination with either a diesel particulate filter or a catalysed soot filter (CSF), and a selective catalytic reduction (SCR) catalyst, preferably wherein the oxidation catalyst is, or is for use as, a diesel oxidation catalyst. The oxidation catalyst is typically followed by (e.g. is upstream of) the diesel particulate filter or the catalysed soot filter (CSF). The DPF or CSF is typically followed by (e.g. is upstream of) the selective catalytic reduction (SCR) catalyst. A nitrogenous reductant injector may be arranged between the DPF or CSF and the selective catalytic reduction (SCR) catalyst. Thus, the DPF or CSF may be followed by (e.g. is upstream of) a nitrogenous reductant injector, and the nitrogenous reductant injector may be followed by (e.g. is upstream of) the selective catalytic reduction (SCR) catalyst.

A sixth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. A further aspect of this embodiment relates to the use of the oxidation catalyst for treating an exhaust gas from a compression ignition engine in combination with a diesel oxidation catalyst (DOC) and a selective catalytic reduction (SCR) catalyst, preferably wherein the oxidation catalyst is, or is for use as, a catalysed soot filter (CSF). The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a seventh exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the oxidation catalyst for treating an exhaust gas from a combustion engine, particularly a compression ignition engine, in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the seventh exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A further aspect of the invention relates to a vehicle or an apparatus comprising an internal combustion engine and either the oxidation catalyst of the invention or the exhaust system of the invention.

Typically, the engine may be used in a mobile application, such as a vehicle, or in a stationary application, such as a power generation unit.

The internal combustion engine may be a spark-ignition engine (e.g. a gasoline spark-ignition engine) or a compression ignition engine. It is preferred that the internal combustion engine is a compression ignition engine. More preferably, the compression ignition engine is a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

When the internal combustion engine is a compression ignition engine, such as a diesel engine, then the vehicle may be a light-duty diesel vehicle or a heavy-duty diesel vehicle.

The term "light-duty diesel vehicle (LDV)" is defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

In general, a heavy-duty diesel vehicle (HDV) is a diesel vehicle having a gross weight of >8,500 pounds (US lbs), such as defined in US legislation.

Also provided is a method of preparing an oxidation catalyst according to the invention. In general, the method involves using at least one noble metal component (i.e. the first noble metal component) that does not fix rapidly to the substrate or a support material and which is mobile within a coating. When a coating containing such a noble metal component is applied to a substrate, then the coating is dried and calcined using the conditions that allow movement of the noble metal component within the coating before it is fixed into position. Such conditions are known in the art, particularly because conditions in the prior art are normally selected to rapidly fix the components of the coating (i.e. washcoat coating) to prevent their movement within the coating.

The transfer of solutes to or away from a wet surface during evaporation is an effect that is known in other technical fields. The transfer of the first noble metal (i.e. a noble metal salt comprising the first noble metal) within a wet coating can be represented by Richards' equation:

$$\frac{\partial \theta}{\partial t} = \frac{\partial}{\partial z}\left[K(\theta)\left(\frac{\partial \psi}{\partial z}\right) + 1\right]$$

wherein:

t is the time (e.g. the time before substantial or complete evaporation of the solvent (i.e. water)); θ is the solvent (i.e. water) content, typically of the coating; K is the hydraulic conductivity; z is the elevation; and ψ is the pressure head. The hydraulic conductivity can be approximated by the hydraulic conductivity of the first support material and/or any other support material that may be present.

The method of the invention therefore comprises:

(a) providing an aqueous slurry comprising a first support material precursor, a first noble metal component and a second noble metal component;
(b) applying the aqueous slurry onto a substrate to form a coating; and
(c) drying and calcining the coating, wherein the drying conditions allow at least the first noble metal component to flow toward or away from the substrate, such as to obtain a non-uniform distribution of the first noble metal in a direction perpendicular to a surface of the substrate.

The method of the invention refers to a slurry. Normally, at least one of the first support material precursor, the first noble metal component and the second noble metal component is insoluble. However, it is to be understood that the slurry may be solution, such as when the first support material precursor, the first noble metal component and the second noble metal component are all soluble (i.e. dissolved).

Typically, the first support material precursor is a compound that undergoes conversion into the first support material after drying and/or calcining the coating. Such support material precursors are well-known in the art. In some instances, the first support material precursor may be the first support material (i.e. it is not necessary to include a precursor that is converted to the support material during the method).

Generally, the first noble metal component is a salt of the first noble metal or is the first noble metal (i.e. it is the first noble metal itself). Preferably, the first noble metal component is a salt of the first noble metal. The salt of the first noble metal may be a nitrate salt of the first noble metal, an acetate salt of the first noble metal or a carboxylate salt (e.g. citrate salt) of the first noble metal.

The second noble metal component typically is a salt of the second noble metal or is the second noble metal (i.e. it is the second noble metal itself). It is preferred that the second noble metal component is a salt of the second noble metal. The salt of the second noble metal may be a nitrate salt of the second noble metal, an acetate salt of the second noble metal or a carboxylate salt (e.g. citrate salt) of the second noble metal.

When different noble metals are used (e.g. the first noble metal is different to the second noble metal), then there may be a difference in the mobility of the first noble metal component compared with the second noble metal component that results from the difference in metals that are present. It is possible to vary the mobility, and also the preferred direction of flow, of the noble metal components by selecting an appropriate anion when the noble metal component is a salt of a noble metal. The noble metal components may also interact differently with the support material and may be selected on this basis.

It is preferred that a counteranion of the salt of the first noble metal is different to a counteranion of the salt of the second noble metal. For example, the first noble metal component may be palladium nitrate and the second noble metal component may be a platinum carboxylate salt. The nitrate anion is different to the carboxylate anion.

The mobility of at least one of the noble metal components can be altered by supporting it on a support material (i.e. pre-fixing the noble metal component) before mixing with the other noble metal component.

One way that the first noble metal component may be supported on the first support material precursor by: (i) mixing a first support material precursor and a first noble metal component in solution, preferably to impregnate, or fill the pores of, the first support material precursor; and (ii) drying and/or calcining the aqueous solution to provide a first noble metal component (e.g. first noble metal) supported on the first support material precursor (e.g. the first support material). Step (i) may be followed by a step (i)(a) of adding a reducing agent to reduce the first noble metal component, preferably to impregnate, or fill the pores of, the first support material precursor. In step (i) and/or (i)(a), it is preferred that the only noble metal component present is the first noble metal component.

Thus, step (a) of the method of the invention may be a step of (a) providing an aqueous slurry comprising a second noble metal component and a first noble metal component supported on a first support material precursor.

With regard to step (b), methods for applying slurries or washcoats to a substrate are well known in the art (see for example WO 99/47260 by the present Applicant).

In one embodiment, step (c) involves drying the coating using drying conditions that allow at the first noble metal component and the second noble metal component to flow in opposite directions to one another in relation to the substrate. In another embodiment, step (c) involves drying the coating using drying conditions that allow only the first noble metal component to flow toward or away from the substrate.

Step (c) determines the point at which the noble metal components are fixed, usually on to the substrate or a support material. The drying conditions that are used will depend on the identity of the materials (e.g. the noble metal components, the support material precursor etc) that are present in the coating and the size of the oxidation catalyst (e.g. the size of the substrate, which will vary depending on the application of the catalyst).

Typically, the drying conditions involve drying the coating for at least 15 minutes, preferably at least 20 minutes. A non-uniform distribution of the first noble metal may obtained using such conditions. Uniform distributions tend to be obtained when the drying time is about 5 minutes or less.

The coating may then be calcined at a temperature of 400 to 800° C., preferably 450 to 600° C., more preferably a temperature of at least 500° C.

DEFINITIONS

Any reference to the distribution of a noble metal (e.g. first noble metal or second noble metal) in a direction (e.g. a straight line) perpendicular to the surface of the substrate generally refers to a direction perpendicular to the same surface of the substrate upon which the catalyst layer is disposed. For reference purposes, the surface of the substrate is generally in the horizontal (i.e. longitudinal) plane. The direction perpendicular to the surface of the substrate is typically a direction in a cross-sectional plane through the catalyst layer (i.e. a cross-sectional plane that exposes the thickness of the catalyst layer) perpendicular to the surface of the substrate. The cross-sectional plane is generally in a vertical (i.e. transverse) plane. The cross-sectional plane is perpendicular to the surface on which the catalyst layer is disposed. More typically, the cross-sectional plane is substantially parallel to an inlet end face of the substrate and/or the outlet end face of the substrate (i.e. the plane containing the inlet end face and/or the plane containing the outlet end face). Any reference to "substantially parallel" in this context refers to an angle of less than 5°, preferably less than 2.5°, more preferably less than 1° (e.g. less than 0.5°), between the cross-sectional plane and the inlet end face or the outlet end face of the substrate.

Any reference to a "surface of the substrate" generally refers to the surface of a wall of a channel through the substrate.

The term "layer" (e.g. catalyst layer) as used herein refers to a thickness of material spread over a surface, such as a surface of a substrate or a surface of another layer, which typically has distinct boundaries or edges (i.e. it is possible to distinguish one layer from another layer using conventional analytical techniques (e.g. transmission electron microscopy).

The term "uniform" as used herein with reference to the distribution of a noble metal generally refers to a composition (e.g. a layer) where the amount of noble metal at any point in the composition is within ±20% of the mean amount of noble metal in the entire composition (e.g. layer). It is preferred that the amount of noble metal at any point in the composition is within ±10%, more preferably ±5%, and even more preferably ±1%, of the mean amount of noble metal in the entire composition (e.g. layer). The mean amount of noble metal should correspond to the amount of noble metal that is measured out during preparation of that composition. The amount of noble metal at any point in a composition can be determined using conventional analytical techniques, such as by EDX analysis using a transmission electron microscope.

The term "mixed oxide" as used herein generally refers to a mixture of oxides in a single phase, as is conventionally known in the art.

The term "composite oxide" as used herein generally refers to a composition of oxides having more than one phase, as is conventionally known in the art.

Amounts given in units of g ft$^{-3}$ or g in$^{-3}$ generally relate to the volume of the substrate that is used.

The expression "consisting essentially" as used herein limits the scope of a feature to include the specified materials or steps, and any other materials or steps that do not materially affect the basic characteristics of that feature, such as for example minor impurities. The expression "consisting essentially of" embraces the expression "consisting of".

In the context of the expression "noble metal" (e.g. first noble metal or second noble metal), it is to be appreciated that it is often difficult to characterise the exact catalytic species in a catalyst and the noble metal may not be present in elemental, metallic form. Any reference to "consisting essentially of a noble metal . . . " embraces a "noble metal moiety" in an elemental form of the noble metal, an alloy containing the noble metal or a compound comprising the noble metal (e.g. an oxide of the noble metal). Preferably, any such "noble metal moiety" is an elemental form of the noble metal or an alloy containing the noble metal, more preferably an elemental form of the noble metal.

EXAMPLES

The invention will now be illustrated by the following non-limiting examples.

Example 1

Preparation of a Single Layer, Non-Uniform Catalyst

Silica-alumina powder was slurried in water and milled to a $d_{90}$ of less than 20 micron. A soluble platinum carboxylate salt and palladium nitrate was added to the slurry and the mixture was stirred to homogenise. The resulting washcoat was then applied to a substrate (a cordierite flow through monolith having 400 cells per square inch) using conventional coating techniques. The resulting part was dried slowly under a flow of heated air. The part was completely dry after 20 minutes of operation and was then calcined at 500° C. The fresh catalyst composition that coated the substrate was then aged by heating at 750° C. for 15 hours under hydrothermal conditions (10% water).

Figure 2:
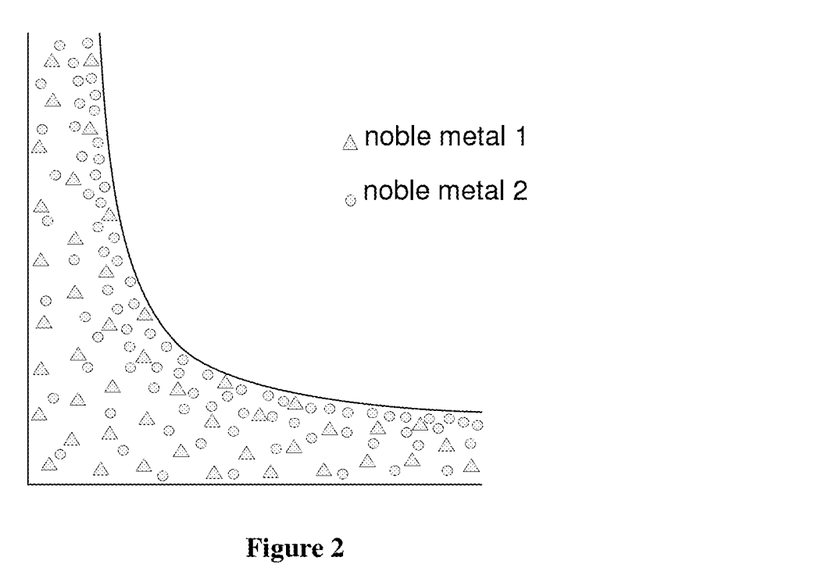
FIG. 2 is a schematic illustration of a layer according to the invention, which has a uniform or homogenous distribution of a first noble metal (e.g. noble metal 1 as represented by Δ) and a non-uniform (i.e. non-homogenous) distribution of a second noble metal (e.g. noble metal 2 as represented by ○).

Slow drying conditions were used to dry the washcoat onto the substrate. These conditions were selected to allow movement of the palladium salt during drying (i.e. as the water in the washcoat evaporated) until the palladium was fixed into position by complete evaporation of the liquid phase of the washcoat. The distribution of the platinum and palladium components of the catalyst layer is represented schematically in FIG. 2 (platinum=noble metal 1; palladium=noble metal 2).

Comparative Example 2

Preparation of a Single Layer, Uniform Catalyst

As a comparison, a catalyst was prepared using the materials that were used in Example 1 and was coated onto the same type of substrate by the same method. The resulting part was dried quickly under a high velocity flow of heated air. The part was completely dry after 5 minutes of operation and was then calcined at 500° C. The fresh catalyst composition that coated the substrate was then aged by heating at 750° C. for 15 hours under hydrothermal conditions (10% water).

Figure 3:
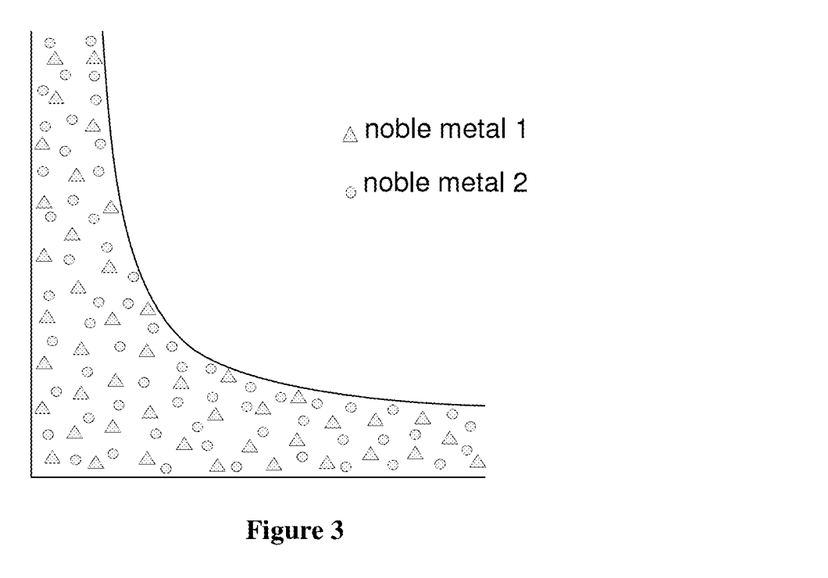
FIG. 3 is a schematic illustration showing the uniform distribution of two noble metals (e.g. noble metal 1 as represented by Δ and noble metal 2 as represented by ○) in conventional oxidation catalysts.

Conventional, rapid drying conditions were used to dry the washcoat onto the substrate to obtain a catalyst layer having a uniform composition. The distribution of the platinum and palladium components of the catalyst layer is represented schematically in FIG. 3 (platinum=noble metal 1; palladium=noble metal 2).

Example 3

Preparation and Analysis of a Multi-Layered Catalyst with a Non-Uniform Layer

A substrate monolith of 400 cells per square inch and wall thickness of 6 thousands of an inch was prepared having a two layer structure. The first layer that was coated onto the substrate (i.e. the lower layer) contained platinum and palladium on an alumina support. The weight content of platinum was greater than that of palladium. The second layer (i.e. the upper layer) had a composition was prepared using the method in Example 1 to provide a layer having a non-uniform distribution of palladium.

Figure 1:
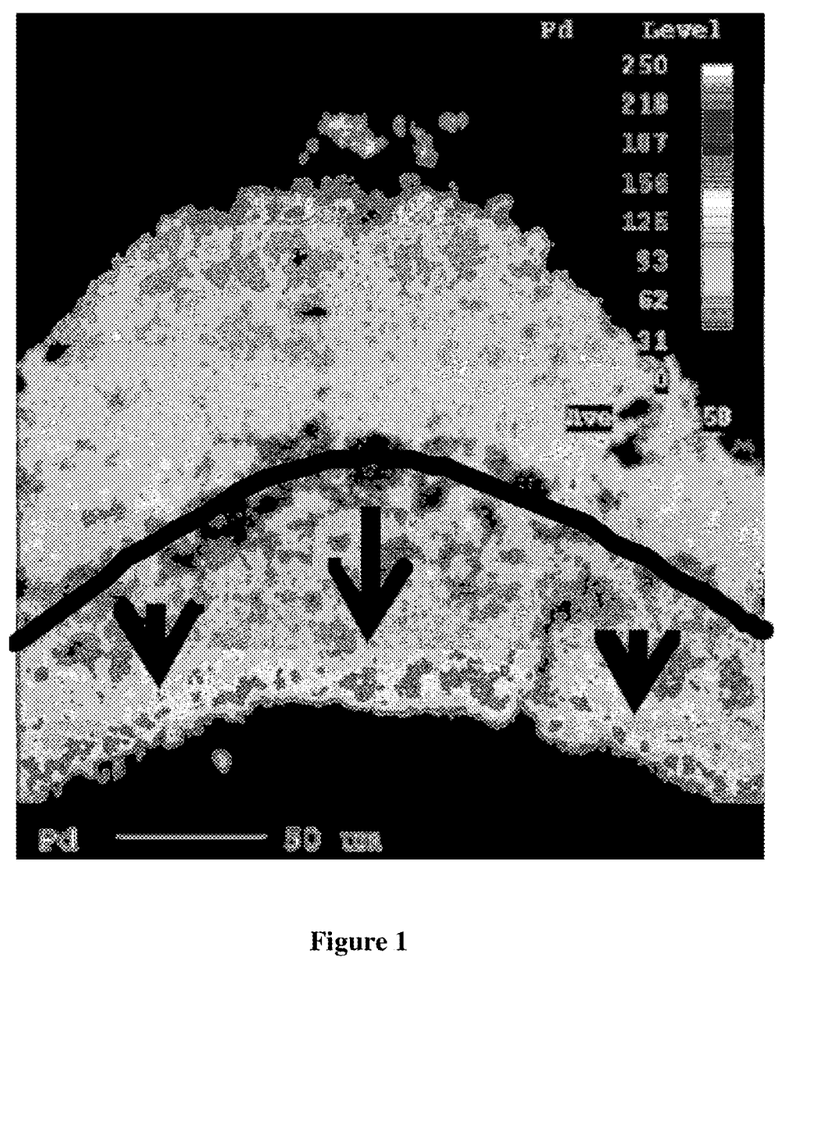
FIG. 1 is an EPMA-WDX image (electron microprobe analysis-wavelength dispersive x-ray) that shows the composition of the layers of the catalyst of Example 3. The image shows that there is a homogenous or uniform distribution of platinum and palladium particles in the layer above the black line (the layer that was first coated directly on to the substrate). A non-uniform distribution of palladium particles was obtained in the layer below the black line. The black arrows in the image show that a high concentration of palladium particles was obtained near the exposed surface of the layer.

A section of the catalyst was resin mounted, ground and polished, then vacuum carbon coated. EPMA-WDX analyses showed that the first layer (i.e. bottom layer) contained a uniform distribution of palladium and platinum particles (see FIG. 1). The second layer (i.e. upper layer) contained a non-uniform distribution of palladium particles. In particular, the second layer contained a high concentration of palladium nearer its exposed surface (where exhaust emissions first contact the layer) compared to regions of the layer that were closer to the first layer.

Example 4

Results of Emissions Tests

Core samples were taken from each of the catalysts of Examples 1 and 2 using a 1 inch core drill. The catalyst compositions were tested in a simulated catalyst activity testing (SCAT) gas rig using the inlet gas mixture shown in Table 1 with a space velocity of 55000/hour to mimic engine emissions.

TABLE 1

| Gas | Concentration |
|---|---|
| CO | 1500 ppm |
| HC (as $C_1$) | 430 ppm |
| NO | 100 ppm |
| $CO_2$ | 4% |
| $H_2O$ | 4% |
| $O_2$ | 14% |

The results for the aged catalysts of Examples 1 and 2 are shown in Table 2. Table 2 lists the temperatures at which 50% conversion of CO ($T_{50}$ CO) and 80% conversion of HC ($T_{80}$ HC) occurred.

TABLE 2

| Example No. | $T_{50}$ CO (° C.) | $T_{80}$ HC (° C.) |
|---|---|---|
| 1 | 141 | 154 |
| 2 | 147 | 160 |

The results in Table 2 show that when the simulated exhaust gas is exposed to the catalyst of Example 1, which has a high concentration of palladium particles near an exposed surface of the washcoat coating, then the temperatures for 50% conversion of CO and 80% conversion of HC are lower than those obtained for Comparative Example 2.

For the avoidance of any doubt, the entire content of any and all documents cited herein is incorporated by reference into the present application.

The invention claimed is:

1. An oxidation catalyst for treating an exhaust gas produced by a combustion engine, wherein the oxidation catalyst comprises a substrate and a catalyst layer, wherein the catalyst layer comprises:

a first support material;
a first noble metal; and
a second noble metal;
wherein the catalyst layer is disposed on a surface of the substrate, and the catalyst layer has a non-uniform distribution of the first noble metal in a direction perpendicular to the surface of the substrate, wherein the non-uniform distribution of the first noble metal in a direction perpendicular to the surface of the substrate is either (a) a gradated distribution of the first noble metal or (b) a step-wise distribution of the first noble metal.

2. An oxidation catalyst according to claim 1, wherein the amount of the first noble metal increases in a perpendicular direction toward the surface of the substrate.

3. An oxidation catalyst according to claim 1, wherein the amount of the first noble metal decreases in a perpendicular direction toward the surface of the substrate.

4. An oxidation catalyst according to claim 3, wherein the catalyst layer has a first surface and a second surface, and at least 60% of the total amount of the first noble metal is distributed between the first surface and a plane in the catalyst layer that is half way between the first surface and the second surface.

5. An oxidation catalyst according to claim 1, wherein the first noble metal is selected from the group consisting of ruthenium, rhodium, palladium, osmium, iridium, platinum, silver and gold.

6. An oxidation catalyst according to claim 5, wherein the first noble metal is palladium.

7. An oxidation catalyst according to claim 1, wherein the first support material comprises a refractory oxide selected from the group consisting of alumina, magnesia, silica, zirconia, titania, ceria and a composite oxide or a mixed oxide of two or more thereof.

8. An oxidation catalyst according to claim 1, wherein the second noble metal is selected from the group consisting of ruthenium, rhodium, palladium, osmium, iridium, platinum, silver and gold.

9. An exhaust system for a combustion engine comprising an oxidation catalyst according to claim 1, and at least one emissions control device.

10. A method of treating an exhaust gas produced by an internal combustion engine, which method comprises contacting the exhaust gas with an oxidation catalyst, wherein the oxidation catalyst comprises a substrate and a catalyst layer, wherein the catalyst layer comprises:
a first support material;
a first noble metal; and
a second noble metal;
wherein the catalyst layer is disposed on a surface of the substrate and has a non-uniform distribution of the first noble metal in a direction perpendicular to the surface of the substrate, wherein the non-uniform distribution of the first noble metal in a direction perpendicular to the surface of the substrate is either (a) a gradated distribution of the first noble metal or (b) a step-wise distribution of the first noble metal.

11. An oxidation catalyst for treating an exhaust gas produced by a combustion engine, wherein the oxidation catalyst comprises a substrate and a catalyst layer, wherein the catalyst layer comprises:
a first support material;
a first noble metal; and
a second noble metal;
wherein the catalyst layer is disposed on a surface of the substrate, and the catalyst layer has a non-uniform distribution of the first noble metal in a direction perpendicular to the surface of the substrate, wherein the amount of the first noble metal either (a) increases in a perpendicular direction toward the surface of the substrate or (b) decreases in a perpendicular direction toward the surface of the substrate.

12. An oxidation catalyst according to claim 11, wherein the catalyst layer has a first surface and a second surface, and at least 60% of the total amount of the first noble metal is distributed between the first surface and a plane in the catalyst layer that is half way between the first surface and the second surface.

13. An oxidation catalyst according to claim 12, wherein the first noble metal is selected from the group consisting of ruthenium, rhodium, palladium, osmium, iridium, platinum, silver and gold.

14. An oxidation catalyst according to claim 13, wherein the first noble metal is palladium.

15. An oxidation catalyst according to claim 11, wherein the first support material comprises a refractory oxide selected from the group consisting of alumina, magnesia, silica, zirconia, titania, ceria and a composite oxide or a mixed oxide of two or more thereof.

16. An oxidation catalyst according to claim 11, wherein the second noble metal is selected from the group consisting of ruthenium, rhodium, palladium, osmium, iridium, platinum, silver and gold.

* * * * *